(12) United States Patent
Nakamura et al.

(10) Patent No.: US 7,909,075 B2
(45) Date of Patent: Mar. 22, 2011

(54) PNEUMATIC TIRE WITH TREAD HAVING NARROW GROOVE

(75) Inventors: Yuichi Nakamura, Osaka (JP); Hiroaki Sugimoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 729 days.

(21) Appl. No.: 11/852,429

(22) Filed: Sep. 10, 2007

(65) Prior Publication Data

US 2008/0251179 A1 Oct. 16, 2008

(30) Foreign Application Priority Data

Apr. 16, 2007 (JP) ................................ 2007-107090

(51) Int. Cl.
*B60C 11/13* (2006.01)
(52) U.S. Cl. .............................. 152/209.21; 152/209.27
(58) Field of Classification Search ............. 152/209.21, 152/209.27, DIG. 3
See application file for complete search history.

(56) References Cited

FOREIGN PATENT DOCUMENTS

| JP | 03-007604 | * | 1/1991 |
|---|---|---|---|
| JP | 06-191230 | | 7/1994 |
| JP | 07-076204 | | 3/1995 |
| JP | 11-301214 | | 11/1999 |
| JP | 2002-019420 | * | 1/2002 |
| JP | 2002-512575 | | 4/2002 |
| WO | WO 98/26945 | | 6/1998 |

OTHER PUBLICATIONS

Machine translation for Japan 06-191230 (no date).*
Machine translation for Japan 11-301214 (no date).*
Machine translation for Japan 2002-019420 (no date).*

* cited by examiner

*Primary Examiner* — Steven D Maki
(74) *Attorney, Agent, or Firm* — Fish & Richardson P.C.

(57) ABSTRACT

A pneumatic tire comprising a shoulder land portion and a narrow groove, the narrow groove comprises a first enlarged portion enlarging a groove width at a groove bottom only on the sacrificed portion side, a second enlarged portion being formed adjacently on the tread face side of the first enlarged portion and enlarging a groove width only on the sacrificed portion side, a projection portion being formed between the first enlarged portion and the second enlarged portion while projecting toward the main body land portion from an inner wall on the sacrificed land portion side, and a flat face portion having a depth, from the tread face, of 30% or more of a groove depth of the narrow groove, and having an inner wall on the sacrificed land portion side and an inner wall on the main body land portion side.

4 Claims, 2 Drawing Sheets

PNEUMATIC TIRE WITH TREAD HAVING NARROW GROOVE

BACKGROUND OF THE INVENTION

1. Field of the Invention

The present invention relates to a pneumatic tire provided with, on a tread face, a shoulder land portion extending in a circumferential direction of the tire, and a narrow groove extending in the circumferential direction of the tire near a ground contact end of the shoulder land portion and dividing the shoulder land portion into a main body land portion on the inner side in a width direction of the tire and a sacrificed land portion on the outer side in the width direction of the tire.

2. Description of the Related Art

In order to prevent irregular wear of a tire, a technique for providing, on a tread face, a narrow groove near a ground contact end of a shoulder land portion extending in a circumferential direction of the tire has been conventionally, publicly known. However, when a sacrificed land portion is excessively deformed by an input from a road surface while running, strain is concentrated on a groove bottom so as to generate a crack. Thus, there is a problem on durability of a tire.

For example, as shown in FIG. 3, especially when a vehicle runs on the stepped portion 10, such as a shoulder of a road, extending in a vehicle running direction, the sacrificed portion 11 is excessively deformed by overriding on the stepped portion 10. Further, when a groove bottom of a narrow groove 12 receives an input in the arrow direction, a crack of such a groove bottom easily occurs. In this case, when the sacrificed land portion 11 is made thinner, stress hardly works on the groove bottom even when the sacrificed land portion 11 is deformed, and thus a crack hardly occurs. However, there are problems that the sacrificed land portion 11 itself may be torn and removed, and the prevention effect of irregular wear of a tire decreases.

As means for preventing generation of a crack in a narrow groove, for example, Japanese Unexamined Patent Publication (Kokai) No. Hei 11-301214 discloses a technique for preventing generation of a crack at a groove bottom of a narrow groove or a portion near the groove bottom by providing, in the middle of a depth direction of the narrow groove and at an inner wall of the narrow groove in the main body land portion side at least one enlarged portion continuing in a circumferential direction of the tire. However, as for the pneumatic tire mentioned above, when a sacrificed land portion receives an input from a road surface and falls toward the main body land portion, the main body land portion is easily deformed, and thus the main body land portion is worn in comparative-early time. Thus, there arises a problem that an object of providing the narrow groove, i.e., retarding wear of the main body land portion so as to prevent irregular wear, cannot be realized. Further, although the enlarged portion is provided at the groove bottom, a main object of a form of the narrow groove in the pneumatic tire in Japanese Unexamined Patent Publication (Kokai) No. Hei 11-301214 is to reduce strain caused by deforming the main body land portion. Thus, Japanese Unexamined Patent Publication (Kokai) No. Hei 11-301214 does not disclose a technique for preventing a crack caused by deforming the sacrificed land portion. Furthermore, this technique cannot prevent a crack in a narrow groove when receiving the big input from the stepped portion 10 as shown in FIG. 3.

Further, Japanese Unexamined Patent Publication (Kokai) No. Hei 7-76204 discloses a technique for reducing generation of a crack at a groove bottom by providing at least one cut groove extending in a circumferential direction of a tire at an inner wall on the main body land portion side of the narrow groove, and by making an area of the inner wall on the main body land portion side to be larger than an area of an inner wall on the sacrificed land portion side. However, as for the pneumatic tire mentioned above, the main body land portion is easily deformed since the cut groove is provided at an inner wall on the main body land portion side. Therefore, there is a similar problem in Japanese Unexamined Patent Publication (Kokai) No. Hei 11-301214.

Further, Japanese Unexamined Patent Publication (Kokai) No. Hei 6-191230 discloses a technique for preventing generation of a crack at a narrow groove caused by biting a stone, by providing, at an intermediate portion in a depth direction of the narrow groove, an enlarged portion enlarging in a width direction of a tire. However, as for this pneumatic tire, generation of a crack is prevented by preventing biting a stone in the narrow groove, therefore generation of a crack caused by the input from a road surface mentioned above cannot be prevented.

Furthermore, Published Japanese Translation No. 2002-512575 of the PCT Application discloses a technique for preventing generation of a crack at a groove bottom by providing an enlarged portion on the sacrificed land portion side of the groove bottom in a narrow groove. However, when a sacrificed land portion is excessively deformed at the time of particularly running on a shoulder of a road or the like, so as to work a large stress on the groove bottom, an effect to distribute the stress is insufficient, and thus generation of a crack at the groove bottom may not be prevented.

SUMMARY OF THE INVENTION

Under these circumstances mentioned hereinbefore, the present invention has been made and an object of the present invention is to provide a pneumatic tire capable of effectively preventing a crack generated at a groove bottom in a narrow groove while keeping irregular wear resistance.

The above described object can be achieved by the present invention as follows.

That is, the present invention provides a pneumatic tire comprising: a shoulder land portion extending in a circumferential direction of the tire, and a narrow groove extending in the circumferential direction of the tire near a ground contact end of the shoulder land portion and dividing the shoulder land portion into a main body land portion on the inner side in a width direction of the tire and a sacrificed land portion on the outer side in the width direction of the tire, the shoulder land portion and the narrow groove being provided on a tread face, wherein the narrow groove comprises: a first enlarged portion extending in the circumferential direction of the tire and enlarging a groove width at a groove bottom only on the sacrificed portion side, a second enlarged portion being formed adjacently on the tread face side of the first enlarged portion, extending in the circumferential direction of the tire, and enlarging a groove width only on the sacrificed portion side, a projection portion being formed between the first enlarged portion and the second enlarged portion, and extending in the circumferential direction of the tire while projecting toward the main body land portion from an inner wall on the sacrificed land portion side, and a flat face portion having a depth, from the tread face, of 30% or more of a groove depth of the narrow groove, and having an inner wall on the sacrificed land portion side and an inner wall on the main body land portion side, both inner walls extending in the circumferential direction of the tire.

In the present invention, the narrow groove is provided with the first enlarged portion positioned at the groove bottom, the second enlarged portion formed adjacently to the first enlarged portion, and the projection portion between those. In this constitution, when the sacrificed land portion is largely deformed, stress concentration on the groove bottom can be reduced, and thus generation of a crack in the narrow groove can be prevented. Further, the first enlarged portion and the second enlarged portion are made by enlarging a groove width only on the sacrificed land portion side, and extend in the circumferential direction of the tire, and thus rigidity of the main body land portion can be properly kept. Therefore, when the sacrificed land portion is fallen toward the main body land portion by receiving an input from a road surface, the deformation of the main body land portion can be prevented, so that irregular wear can be prevented. Furthermore, the narrow groove is provided with a flat face portion having a depth, from the tread face, of 30% or more of a groove depth of the narrow groove, and having an inner wall on the sacrificed land portion side and an inner wall on the main body land portion side, both inner walls extending in the circumferential direction of the tire. Thus, when the sacrificed land portion falls toward the main body land portion by receiving the input from a road surface, the main body land portion can receive the sacrificed land portion, and the deformation of the main body land portion and the sacrificed land portion can be suppressed. Thus, stress concentration on the groove bottom can be reduced, generation of a crack in the narrow groove can be prevented, and irregular wear can also be prevented.

In the pneumatic tire mentioned hereinbefore, it is preferable that the first enlarged portion and the second enlarged portion are made by recessing an inner wall on the sacrificed portion side so as to have an arcuate cross section. According to this constitution, the radiuses of curvature of the first and the second enlarged portions can be increased. Thus, when the sacrificed land portion is largely deformed, stress concentration on an inner wall of the first and the second enlarged portions can be reduced, and thus generation of a crack can be more effectively prevented.

In the pneumatic tire mentioned hereinbefore, it is preferable that the projection portion includes a top end portion having an arcuate cross section, and gently continues to the inner walls on the sacrificed land portion side of the first enlarged portion and the second enlarged portion. According to this constitution, when the sacrificed land portion is deformed, stress concentrating on the groove bottom can be effectively distributed by the first enlarged portion and the second enlarged portion, and thus generation of a crack can be more effectively prevented.

In the pneumatic tire mentioned hereinbefore, it is preferable that the tire is represented by the following formula: $0.2 \times H1 \leq H2 \leq 0.5 \times H1$ when a groove depth of the narrow groove is H1 and a distance in a groove depth direction from a groove bottom of the narrow groove to a position having a maximum groove width of the second enlarged portion is H2. According to this constitution, the second enlarged portion is adjacent to the first enlarged portion positioned at the groove bottom, and thus a prevention effect of a crack can be effectively exercised. Further, the flat face portion can be provided deeply in the groove depth direction. When the sacrificed land portion is deformed, stress concentration on the groove bottom can be reduced, and thus generation of a crack in the narrow groove can be more effectively prevented. Furthermore, the deformation of the main body land portion can be prevented, and thus irregular wear can be more effectively prevented.

In the pneumatic tire mentioned hereinbefore, it is preferable that a maximum groove width of the first enlarged portion and the maximum groove width of the second enlarged portion are made different each other. According to this constitution, when the maximum groove width of the first enlarged portion is larger than the groove width of the second enlarged portion, loss of rigidity of the sacrificed land portion can be reduced, and thus irregular wear can be more effectively prevented. On the other hand, when the maximum groove width of the second enlarged portion is larger than the groove width of the first enlarged portion, stress easily works on the second enlarged portion, and thus stress concentration on the groove bottom can be reduced. Therefore, generation of a crack at the groove bottom can be more effectively prevented.

DETAILED DESCRIPTION OF THE PREFERRED EMBODIMENTS

Figure 1:
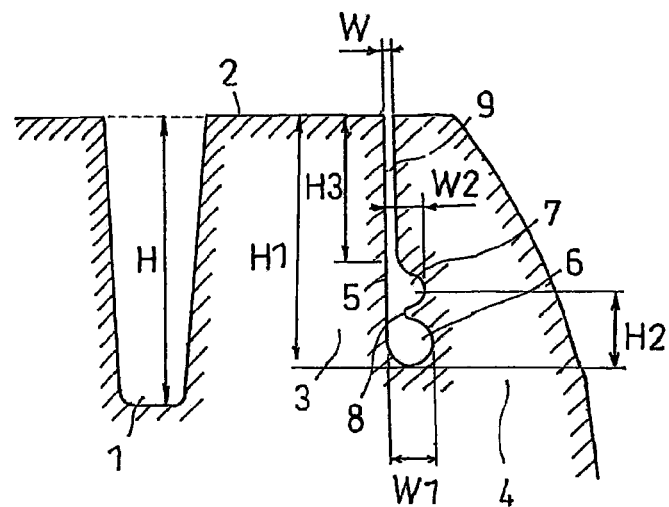
FIG. 1 is an example of a tire meridian cross-sectional view in a shoulder land portion of a pneumatic tire according to the present invention.

Embodiments of the present invention will now be described with reference to the drawings. FIG. 1 is an example of a tire meridian cross-sectional view in a shoulder land portion of a pneumatic tire according to the present invention.

As shown in FIG. 1, in this embodiment, a shoulder land portion 2 and a narrow groove 5 are provided on a tread face of the pneumatic tire. The shoulder land portion 2 extends in a circumferential direction of the tire on the outer side of a main groove 1 positioned on the outermost side in a width direction of the tire among a plurality of main grooves extending in the circumferential direction of the tire. The narrow groove 5 extends in the circumferential direction of the tire near a ground contact end of the shoulder land portion 2 and divides the shoulder land portion 2 into a main body land portion 3 on the inner side in the width direction of the tire and a sacrificed land portion 4 on the outer side in the width direction of the tire. In this embodiment, a tread pattern of the pneumatic tire of the present invention is not especially limited, and can be applied for a rib type, a block type, a rag type or the like. Therefore, the shoulder land portion 2 is not also especially limited. Further, when the narrow groove 5 is provided at an area within 5% of a tread ground contact width based on a tread ground contact end of the tread face of the tire, irregular wear can be more effectively prevented so that it is proper.

The narrow groove 5 includes a first enlarged portion 6, a second enlarged portion 7, and a projection portion 8. The first enlarged portion 6 extends in the circumferential direction of the tire and is made by enlarging a groove width at a groove bottom only on the sacrificed land portion 4 side. The second enlarged portion 7 is formed adjacent on the tread face side of the first enlarged portion 6, extends in the circumferential direction of the tire, and is made by enlarging a groove width only on the sacrificed land portion 4 side. Further, the projection portion 8 is formed between the first enlarged portion 6 and the second enlarged portion 7 and extends in the circumferential direction of the tire while projecting toward the main body land portion 3 from an inner wall of the narrow groove 5 on the sacrificed land portion 4 side.

According to this constitution, when the sacrificed land portion 4 is overridden on a shoulder of a road so as to be largely deformed, stress working on a groove bottom can be distributed by the second enlarged portion 7 and the projection portion 8 in addition to the first enlarged portion 6. Thus, generation of a crack in the narrow groove 5 can be prevented. Further, groove widths in the first enlarged portion 6 and the second enlarged portion 7 are enlarged only on the sacrificed land portion 4 side. Thus, rigidity of the main body land portion 3 can be properly kept, and when the sacrificed land portion 4 is fallen toward the main body land portion 3 by receiving the input from a road surface, the deformation of the main body land portion 3 can be suppressed, and thus irregular wear can be prevented.

On the other hand, when groove widths of the first enlarged portion 6 and the second enlarged portion 7 are enlarged on the main body land portion 3 side and both the first enlarged portion 6 and the second enlarged portion 7 extend in the circumferential direction of the tire, rigidity of the main body land portion 3 decreases, and when the sacrificed land portion 4 is fallen toward the main body land portion 3 by receiving the input from a road surface, the main body land portion 3 is easily deformed, and thus the prevention effect of irregular wear decreases. In addition, the projection portion 8 is projected, at the maximum groove width positions of the first enlarged portion 6 and the second enlarged portion 7, toward the main body land portion 3 from an inner wall on the sacrificed land portion 4 side. If the above-described effect to distribute stress can be properly obtained, the projecting height of the projection portion 8 is not especially limited.

Further, the narrow groove 5 includes a flat face portion 9 having a depth H3, from the tread face, of 30% or more of a groove depth H1 of the narrow groove 5, and including one inner wall on the sacrificed land portion 4 side, said wall extends in the circumferential direction of the tire and another inner wall on the main body land portion 3 side, said wall also extends in the circumferential direction of the tire. According to this constitution, when the sacrificed land portion 4 is fallen toward the main body land portion 3 by receiving the input from a road surface, the main body land portion 3 can receive the sacrificed land portion 4, and thus the deformation of the main body land portion 3 and the sacrificed land portion 4 can be suppressed. Therefore, stress concentration on a groove bottom can be reduced, and thus generation of a crack in the narrow groove 5 can be prevented, and irregular wear can also be effectively prevented. The groove depth H3, from the tread face, of the flat face portion 9 can be 40% or more of the groove depth H1 of the narrow groove 5.

In this constitution, a groove width W of the flat face portion 9 of the narrow groove 5 is preferably 2.0 mm or less, and more preferably 1.0 mm or less. In the case where the groove width W of the flat face portion 9 is more than 2.0 mm, the main body land portion 3 receives the sacrificed land portion 4 when the sacrificed land portion 4 is fallen toward the main body land portion 3 by the input from a road surface. Therefore, the effect for suppressing the deformation of the sacrificed land portion 4 tends to be decreased. Further, a ratio W/W1 which is a ratio of the groove width W of the flat face portion 9 with respect to a maximum groove width W1 of the first enlarged portion 6 is not especially limited, but is preferably 0.1 to 0.3 from the view points of properly exerting the above-described operation and effect.

In addition, the flat face portion 9 is preferably provided continuous to the second enlarged portion 7. Thus, the groove depth H3 of the flat face portion 9 can be more increased, and thus the prevention effect of a crack and the prevention effect of irregular wear can be more properly exercised.

Cross sectional forms of the first enlarged portion 6 and the second enlarged portion 7 are not especially limited, but are preferably made by recessing an inner wall on the sacrificed land portion 4 side so as to have an arcuate cross-section. By taking this form, the radiuses of curvature of the first enlarged portion 6 and the second enlarged portion 7 can be increased. Thus, when the sacrificed land portion 4 is largely deformed, stress concentration on an inner wall of the first enlarged portion 6 and the second enlarged portion 7 can be reduced, and thus generation of a crack can be more effectively prevented.

In this constitution, a radius R1 of curvature of the first enlarged portion 6 is preferably from 1.0 to 3.0 mm, and more preferably from 1.5 to 2.5 mm. When the R1 is less than 1.0 mm, the effect for preventing generation of a crack may be decreased, and when the R1 is more than 3.0 mm, rigidity of the sacrificed portion 4 may be decreased, and thus the effect for preventing the irregular wear tends to be decreased. A radius R2 of curvature of the second enlarged portion 7 is preferably from 0.3 to 3.0 mm, and more preferably from 1.0 to 2.0 mm. When R2 is less than 0.3 mm, the effect for preventing generation of a crack may be decreased, and when the R2 is more than 3.0 mm, rigidity of the sacrificed portion 4 may be decreased, and thus the effect for preventing irregular wear tends to be decreased.

A cross-sectional form of the projection portion 8 is not especially limited. However, it is preferable that the projection portion 8 has an arcuate cross-sectional top end and is gently continues to the inner wall, on the sacrificed land portion 4 side, of the first enlarged portion 6 and the second enlarged portion 7. Accordingly, when the sacrificed portion 4 is deformed, the stress concentration on a groove bottom can be effectively distributed by cooperating with the first enlarged portion 6 and the second enlarged portion 7, and thus generation of a crack can be more effectively prevented.

In this constitution, a radius R3 of curvature of the arcuate cross-sectional top end portion of the projection portion 8 is preferably form 0.2 to 3.0 mm, and more preferably from 0.3 to 1.5 mm. When the R3 is less than 0.2 mm, forming the projection portion 8 is substantially hard, and when the R3 is more than 3.0 mm, the stress concentration on a groove bottom cannot be effectively distributed by the first enlarged portion 6 and the second enlarged portion 7, and thus the effect for preventing generation of a crack in the narrow groove 5 tends to be decreased.

Further, it is preferable that the relationship between the groove depth H1 of the narrow groove 5 and a distance H2 is represented by the formula of $0.2 \times H1 \leq H2 \leq 0.5 \times H1$. The distance H2 in the groove depth direction is from the groove bottom in the narrow groove 5 to the maximum groove width position of the second enlarged portion 7. In such the relationship, the second enlarged portion 7 can be properly adjacent to the first enlarged portion 6 positioned at the groove bottom, and the effect for preventing generation of a crack can be more effectively exercised, and thus it is proper. Further, since the flat face portion 9 can be provided deeply in the groove depth direction, stress concentration on the groove bottom can be reduced, and generation of a crack in the narrow groove 5 can be more effectively prevented in the case where the sacrificed land portion 4 is deformed. Furthermore, deforming the main body land portion 3 can be prevented, and thus irregular wear can be more effectively prevented.

In addition, a ratio H1/H, that is, the groove depth H1 of the narrow groove 5 with respect to the groove depth H of the main groove 1, is not especially limited, but the ratio of 0.8 to 1.2 is exemplarily described.

In this embodiment, as shown in FIG. 1, the relationship between a maximum groove width W1 of the first enlarged portion 6 and a maximum groove width W2 of the second enlarged portion 7 is W1>W2. According to such a constitution, decreasing rigidity of the sacrificed land portion 4 can be suppressed, and the prevention effect of irregular wear can be particularly increased.

According to the present invention, the above-described prevention effect of irregular wear and prevention effect of a crack can be obtained. Therefore, the pneumatic tire of the present invention is particularly effective as a tire, having a shoulder rib, for heavy load, said tire remarkably has a problem of shoulder irregular wear.

The pneumatic tire of the present invention is similar to a general pneumatic tire except that a narrow groove has the above-described constitution, and all of publicly known conventional material, form, constitution, production method and the like can be used for the present invention. In addition, a pneumatic tire having the narrow groove 5 can be produced, for example, by using a metallic mold including a projection having a shape corresponding to the first enlarged portion 6 and the second enlarged portion 7. In this production method, since the sacrificed land portion 4 is elastically deformed at the time of demolding a tire after vulcanizing, there are no problems in a process.

Another Embodiment

Figure 2:
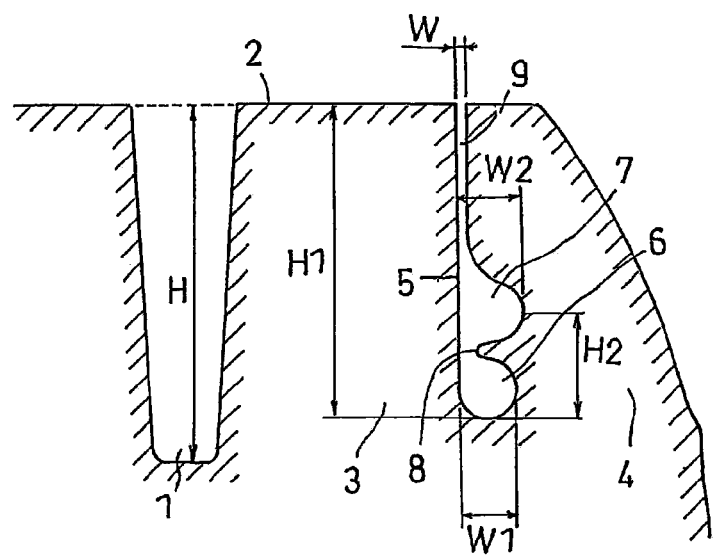
FIG. 2 is an example of a tire meridian cross-sectional view in a shoulder land portion of a pneumatic tire according to the present invention.
Figure 3:
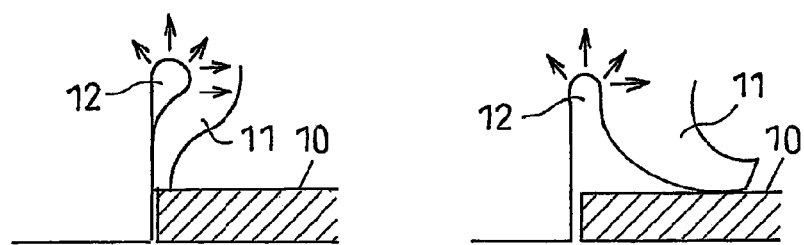
FIG. 3 is an example of a tire meridian cross-sectional view in a shoulder land portion of a pneumatic tire when a sacrificed portion is excessively deformed.

In the above-described embodiment, the case where the maximum groove width W1 of the first enlarged portion 6 is larger than the maximum groove width W2 of the second enlarged portion 7 is exemplarily described. However, the present invention is not limited to the embodiment, and W1 and W2 may be the same. Further, as shown in FIG. 2, W2 may be larger than W1. According to this constitution, stress easily works on the second enlarged portion 7, and the stress concentration on a groove bottom can be more reduced. Thus, generation of a crack at a groove bottom can be more effectively prevented.

EXAMPLES

The constitution and effect of the present invention will now be described in detail by way of examples. In addition, evaluation items in examples are measured as follows.
(1) Irregular wear resistance A test tire was mounted on the front wheel of a tractor head, and ran 150,000 miles (240,000 km) on a dried road surface under the conditions of an inner pressure of 760 kPa and a load of 2,800 kgf. Then, an irregular wear of the test tire was measured and evaluated. Evaluation criteria are as follows.
A: Irregular wear was not generated.
B: Light irregular wear was generated, but there was not necessity to remove the tire.
C: Irregular wear causing to remove the tire was generated.
(2) Groove bottom crack resistance After the test of (1) was finished, it was visually observed whether or not a groove bottom crack was generated. Evaluation criteria are as follows.

A: Any cracks were not generated after running 150,000 miles.
B: A permissible crack was generated after running 150,000 miles.
C: A crack was generated after running 100,000 miles.

Conventional Example 1

A Pneumatic Tire Including no Enlarged Portion in a Narrow Groove

Figure 4:
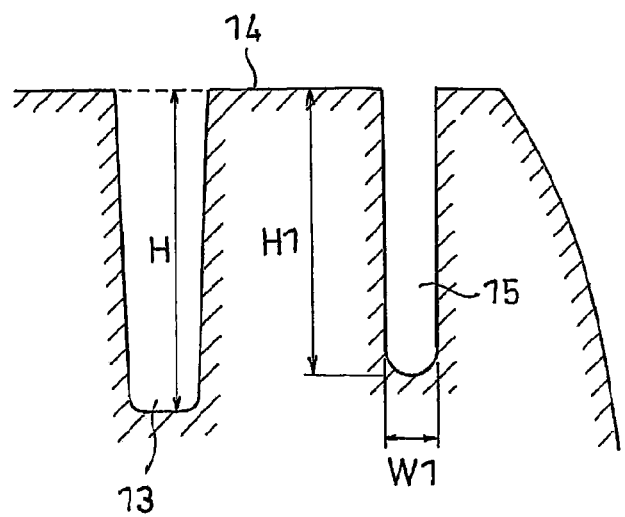
FIG. 4 is an example of a tire meridian cross-sectional view in a shoulder land portion of a conventional pneumatic tire.

A pneumatic tire (having a size of 295/75 R22.5) including a narrow groove 15 shown in FIG. 4 at a shoulder land portion 14 was prepared, and was subjected to the above-described evaluations. A depth H of a main groove 13 was 15.0 mm, a depth H1 of a narrow groove was 15.0 mm, a groove width W1 of the narrow groove 15 was 2.0 mm, and a radius R1 of curvature of a groove bottom having a U-shaped cross section was 1.0 mm.

Conventional Example 2

A Pneumatic Tire Including Only a First Enlarged Portion on the Sacrificed Land Portion Side of a Groove Bottom in a Narrow Groove A pneumatic tire (having a size of 295/75 R22.5) comprising a narrow groove 5 shown in FIG. 1 at a shoulder land portion 2 was prepared, where the tire had a similar tread pattern to that of conventional example 1 except that the tire has a narrow groove including only a first enlarged portion 6 (not including a second enlarged portion 7 and a projection portion 8) on the sacrificed land portion 4 side at a groove bottom, and the maximum groove width W1 and the radius R1 of curvature of the first enlarged portion 6 were set to values shown in table 1. Then, the pneumatic tire was subjected to the above-described evaluations. A depth H of a main groove and a depth H1 of a narrow groove were the same as those in conventional example 1, a groove width W of a flat face portion 9 was 0.5 mm, and a groove depth H3 of the flat face portion 9 was 11.0 mm.

Examples 1 to 3

In a pneumatic tire (having a size of 295/75 R22.5), a narrow groove 5 shown in FIG. 1 at a shoulder land portion 2 was produced, where the tire had a similar tread pattern to that of conventional example 1 except that the tire has a narrow groove 5, and the maximum groove width W1 and radius R1 of curvature of the first enlarged portion 6 of the tire and the maximum groove width W2 and radius R2 of curvature of the second enlarged portion 7 of the tire were set to values shown in table 1. Then, the pneumatic tire was subjected to the above-described evaluations. A depth H of a main groove and a depth H1 of a narrow groove were the same as those in conventional example 1, and a distance H2 in the groove depth direction from a groove bottom of the narrow groove 5 to the maximum groove width position of the second enlarged portion 7 was 5.0 mm, a groove width W of a flat face portion 9 was 0.5 mm, and a groove depth H3 of the flat face portion 9 was 6.5 mm. These results are shown in table 1.

TABLE 1

|  | Conventional Example 1 | Conventional Example 2 | Example 1 | Example 2 | Example 3 |
|---|---|---|---|---|---|
| R1 | 1.0 | 1.5 | 1.5 | 1.5 | 1.5 |
| R2 | — | — | 1.0 | 1.5 | 1.25 |

TABLE 1-continued

| | Conventional Example 1 | Conventional Example 2 | Example 1 | Example 2 | Example 3 |
|---|---|---|---|---|---|
| W1 | 2.0 | 3.0 | 3.0 | 3.0 | 3.0 |
| W2 | — | — | 2.5 | 3.5 | 3.0 |
| Irregular wear resistance | B | A | A | B | B |
| Groove bottom crack resistance | C | C | B | A | B |

It was found out from the results shown in table 1 that groove bottom crack resistance was more improved in the pneumatic tires of examples 1 to 3 including the first enlarged portion 6, the second enlarged portion 7, and the projection portion 8 than those in the pneumatic tire of conventional example 1 including no enlarged portion in a narrow groove and the pneumatic tire of conventional example 2 including only the first enlarged portion 6 on the sacrificed land portion side at a groove bottom in a narrow groove. More particularly, in the pneumatic tire of example 1, in which the maximum groove width W1 of the first enlarged portion 6 was larger than the maximum groove width W2 of the second enlarged portion 7, it was found out that the irregular wear resistance and the groove bottom crack resistance were more improved than those in the pneumatic tires of conventional examples 1 and 2. Further, in the pneumatic tire of example 2, in which the maximum groove width W2 of the second enlarged portion 7 was larger than the maximum groove width W1 of the first enlarged portion 6, it was found out that groove bottom crack resistance was remarkably more improved than those in the pneumatic tires of conventional examples 1 and 2 while keeping irregular wear resistance. In addition, in the pneumatic tire of example 3, in which the maximum groove width W1 of the first enlarged portion 6 and the maximum groove width W2 of the second enlarged portion 7 were the same, it was found out that groove bottom crack resistance was remarkably more improved than those in the pneumatic tires of conventional examples 1 and 2 while keeping irregular wear resistance.

What is claimed is:
1. A pneumatic tire comprising:
a shoulder land portion extending in a circumferential direction of the tire, and a narrow groove extending in the circumferential direction of the tire near a ground contact end of the shoulder land portion and dividing the shoulder land portion into a main body land portion on the inner side in a width direction of the tire and a sacrificed land portion on the outer side in the width direction of the tire, the shoulder land portion and the narrow groove being provided on a tread face,
wherein the narrow groove comprises:
a first enlarged portion extending in the circumferential direction of the tire and enlarging a groove width at a groove bottom only on the sacrificed portion side,
a second enlarged portion being formed adjacently on the tread face side of the first enlarged portion, extending in the circumferential direction of the tire, and enlarging a groove width only on the sacrificed portion side,
a projection portion being formed between the first enlarged portion and the second enlarged portion, and extending in the circumferential direction of the tire while projecting toward the main body land portion from an inner wall on the sacrificed land portion side, and
a flat face portion having a depth, from the tread face, of 30% or more of a groove depth of the narrow groove, and having an inner wall on the sacrificed land portion side and an inner wall on the main body land portion side, both inner walls extending in the circumferential direction of the tire,
wherein the maximum groove width of the first enlarged portion and the maximum groove width of the second enlarged portion are made different from each other.
2. The pneumatic tire according to claim 1,
wherein the first enlarged portion and the second enlarged portion are made by recessing an inner wall on the sacrificed portion side so as to have an arcuate cross section.
3. The pneumatic tire according to claim 1,
wherein the projection portion includes a top end portion having an arcuate cross section, and gently continues to the inner walls on the sacrificed land portion side of the first enlarged portion and the second enlarged portion.
4. The pneumatic tire according to claim 1,
wherein the tire is represented by the following formula: $0.2 \times H1 \leq H2 \leq 0.5 \times H1$ when a groove depth of the narrow groove is H1 and a distance in a groove depth direction from a groove bottom of the narrow groove to a position having the maximum groove width of the second enlarged portion is H2.

* * * * *